United States Patent
Imagawa (10) Patent No.: US 8,634,281 B2
(45) Date of Patent: Jan. 21, 2014

(54) OPTICAL DISC DEVICE

(75) Inventor: Seiji Imagawa, Yokohama (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 134 days.

(21) Appl. No.: 13/410,322

(22) Filed: Mar. 2, 2012

(65) Prior Publication Data

US 2012/0230171 A1 Sep. 13, 2012

(30) Foreign Application Priority Data

Mar. 7, 2011 (JP) ................................. 2011-048473

(51) Int. Cl.
*G11B 7/00* (2006.01)
(52) U.S. Cl.
USPC ...................................................... 369/44.13
(58) Field of Classification Search
None
See application file for complete search history.

(56) References Cited

U.S. PATENT DOCUMENTS

| | | | |
|---|---|---|---|
| 6,314,066 B1 * | 11/2001 | Hong et al. ................. | 369/44.28 |
| RE40,908 E * | 9/2009 | Miyagawa et al. ......... | 369/44.12 |
| 2009/0147660 A1 | 6/2009 | Saito et al. | |
| 2011/0216638 A1 * | 9/2011 | Sakai et al. ................ | 369/44.27 |

FOREIGN PATENT DOCUMENTS

| | | |
|---|---|---|
| JP | 63-26814 | 2/1988 |
| JP | 2001-134961 | 5/2001 |
| JP | 2001-357542 | 12/2001 |
| JP | 2002-312958 | 10/2002 |
| JP | 2008-97694 | 4/2008 |
| JP | 2009-140568 | 6/2009 |
| JP | 2009-170035 | 7/2009 |

* cited by examiner

*Primary Examiner* — Joseph Feild
*Assistant Examiner* — Parul Gupta
(74) *Attorney, Agent, or Firm* — Antonelli, Terry, Stout & Kraus, LLP.

(57) ABSTRACT

The operability of an optical disc device for reading or writing data from/to a disc having a data layer and a servo layer is improved by increasing the resistance to control disturbances. An optical disc device in accordance with the present invention includes an objective lens, a relay lens, a blue-violet laser detector, a red laser detector, an objective lens focus actuator, an objective lens tracking actuator, a relay lens actuator, a pair of focus error signal generating units, a pair of focus control signal generating units, a switching unit for selecting a focus control signal, a pair of tracking error signal generating units, a pair of tracking control signal generating units, a switching unit for selecting a tracking control signal, a focus error conversion unit and a tracking error conversion unit.

8 Claims, 6 Drawing Sheets

OPTICAL DISC DEVICE

CLAIM OF PRIORITY

The present application claims priority from Japanese patent application serial No. JP 2011-048473, filed on Mar. 7, 2011, the content of which is hereby incorporated by reference into this application.

BACKGROUND OF THE INVENTION

1. Field of the Invention

The present invention relates to an optical disc device, and in particular, to the tracking control and the focus control of the optical disc device.

2. Description of the Related Art

Techniques as background arts of this technical field have been disclosed in JP-A-2002-312958, JP-A-2009-140568, JP-A-2001-357542 and JP-A-2009-170035, for example. These Patent Literatures have disclosed a disc having a plurality of data layers and a servo-dedicated layer used for precisely positioning a beam spot on each data layer, an objective lens control method for precisely condensing (focusing) laser spots on the servo layer and the data layer, correction of optical axis shifts of optical beams condensed on the servo layer and the data layer by use of error signals generated from returning light from the servo layer and the data layer, correction of optical axis tilts by use of error signals and shift error signals generated from returning light from the servo layer and the data layer, etc.

Meanwhile, JP-A-63-26814 disclosing a head positioning technique for a magnetic disc device includes a description "In cases where a medium defect exists in a prescribed area of the data surface when the head positioning is executed based on servo information recorded on the servo surface and the head positioning is executed again based on servo information recorded in a prescribed area of the data surface, . . . the medium defect is detected, the head positioning control based on the data-surface servo information is stopped, and the control is returned to the positioning operation based on the servo-surface servo information." (see "Summary" in JP-A-63-26814).

SUMMARY OF THE INVENTION

By providing a servo layer separately from the data layer, condensing beam spots separately on the servo layer and the data layer, and executing the tracking control on the servo layer as in JP-A-2002-312958, JP-A-2009-140568, JP-A-2001-357542, JP-A-2009-170035, guide tracks on the data layer become unnecessary and a medium having a plurality of data layers can be manufactured at a lower cost. Further, the positions of the beam spots can be controlled precisely by using error signals and shift signals calculated from the returning light from the servo layer and the data layer.

However, the conventional techniques can lead to performance deterioration in the control of the beam spot positions since the track pitch of the data layer is desired to be less than or equivalent to that in conventional systems in order to secure a sufficient data capacity whereas the tracking control of the data layer is executed not directly but indirectly based on the returning light from the servo layer. Further, while JP-A-63-26814 (magnetic disc device) has disclosed the stoppage of the head positioning control based on the data-surface servo information and the returning of the control to the positioning operation based on the servo-surface servo information upon detection of a medium defect, no description has been given in regard to switching between control systems regarding the beam spots.

It is therefore the primary object of the present invention to realize high-reliability tracking control and high-reliability focus control in an optical disc device which reproduces or records information by reading or writing data from/to an optical disc having a data layer and a servo layer.

In accordance with an aspect of the present invention, there is provided an optical disc device employing an optical pickup which reproduces or records information by reading or writing data from/to a disc having a data layer and a servo layer, comprising: an objective lens which moves in a radial direction of the disc and thereby moves focusing positions of first and second beam spots in the radial direction of the disc; a tracking actuator which drives the objective lens in the radial direction of the disc; a first detector which converts reflected light of the first beam spot from the data layer into an electric signal; a second detector which converts reflected light of the second beam spot from the servo layer into an electric signal; a first tracking error signal generating unit which generates a first tracking error signal based on the output of the first detector; a second tracking error signal generating unit which generates a second tracking error signal based on the output of the second detector; a tracking control unit which generates a control signal for positioning the first beam spot or the second beam spot at a prescribed track based on the output of the first tracking error signal generating unit or the second tracking error signal generating unit; a tracking actuator driving unit which drives the tracking actuator based on the output of the tracking control unit; and a tracking error level detecting unit which detects a tracking error level based on the output of the first tracking error signal generating unit or the second tracking error signal generating unit. The tracking control unit drives the tracking actuator based on the output of the first detector in normal data reproduction. The tracking control unit detects that the output of the first tracking error signal generating unit has exceeded a prescribed range based on the output of the tracking error level detecting unit and then operates to drive the tracking actuator based on the output of the second detector. The tracking control unit detects that the output of the second tracking error signal generating unit has come within a prescribed range based on the output of the tracking error level detecting unit and then operates to drive the tracking actuator based on the output of the first detector again.

In accordance with another aspect of the present invention, there is provided an optical disc device employing an optical pickup which reproduces or records information by reading or writing data from/to a disc having a data layer and a servo layer, comprising: a first control unit which executes tracking control based on reflected light of a first beam spot condensed on the data layer; and a second control unit which executes the tracking control based on reflected light of a second beam spot condensed on the servo layer. The tracking control in data reproduction is performed by executing switching between the first control unit and the second control unit.

In accordance with another aspect of the present invention, there is provided an optical disc device employing an optical pickup which reproduces or records information by reading or writing data from/to a disc having a data layer and a servo layer, wherein the optical pickup is configured so that the servo negative feedback region of a second focus error signal generated based on reflected light of a second beam spot condensed on the servo layer is wider than the servo negative feedback region of a first focus error signal generated based on reflected light of a first beam spot condensed on the data layer.

According to the present invention, high-reliability tracking control and high-reliability focus control can be realized in optical disc devices reproducing or recording information by reading or writing data from/to an optical disc having a data layer and a servo layer.

DESCRIPTION OF THE PREFERRED EMBODIMENTS

Referring now to the drawings, a description will be given in detail of preferred embodiments in accordance with the present invention.

First Embodiment

Figure 1:
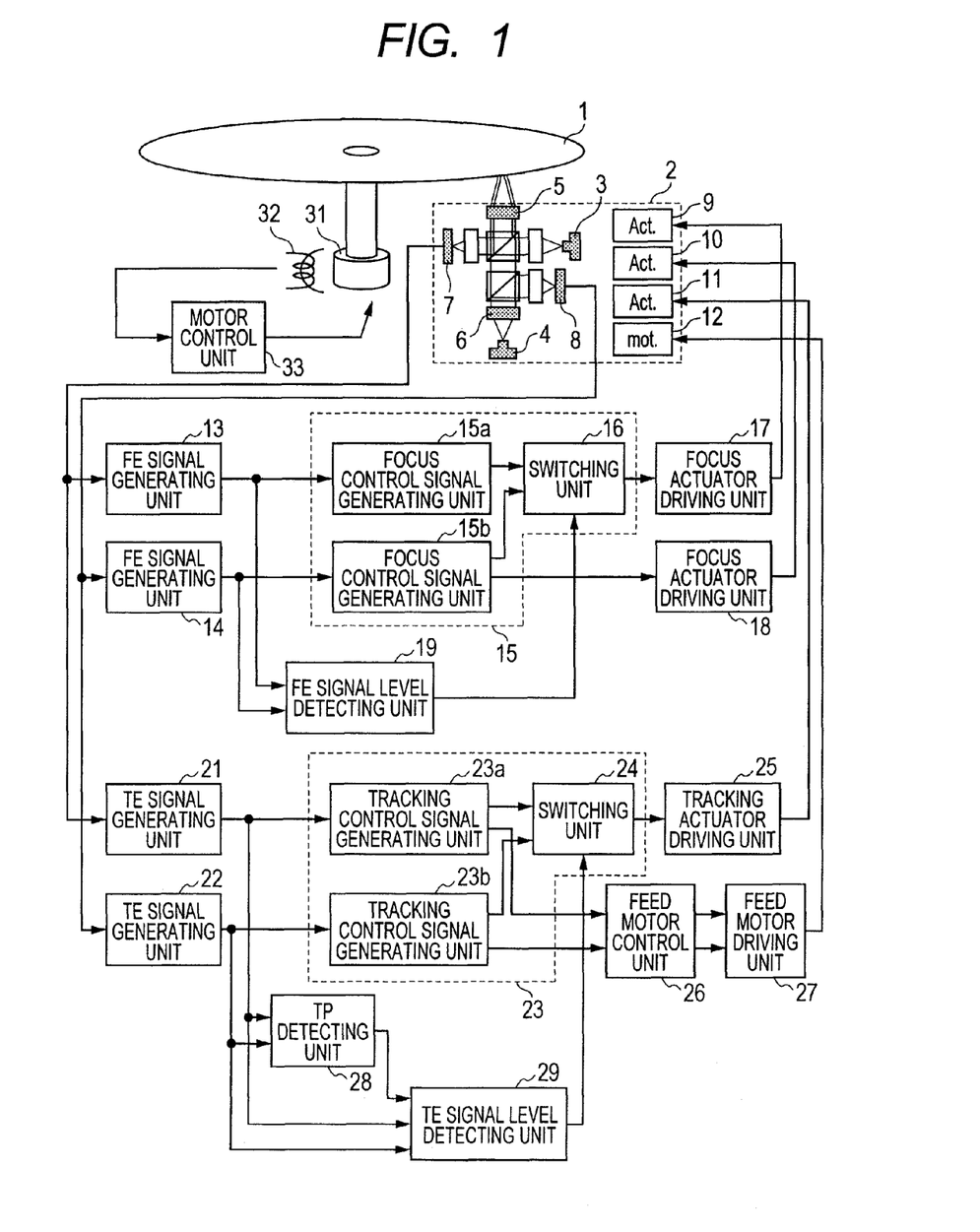
FIG. 1 is a schematic block diagram showing the configuration of an optical disc device in accordance with a first embodiment of the present invention.

FIG. 1 is a schematic block diagram showing the configuration of an optical disc device in accordance with a first embodiment of the present invention. The optical disc device shown in FIG. 1 is a device for reading or writing data from/to a disc 1 (optical disc). The optical disc device includes an optical pickup unit 2, a blue-violet laser diode 3, a red laser diode 4, an objective lens 5, a relay lens 6, a blue-violet laser detector 7, a red laser detector 8, an objective lens focus actuator 9, a relay lens actuator 10, an objective lens tracking actuator 11, and a pickup feed motor 12. For the focus control, the optical disc device includes focus error signal generating units 13 and 14, a focus control signal generating unit 15 (including focus control signal generating units 15a and 15b), a switching unit 16, a focus actuator driving unit 17, a relay lens actuator driving unit 18 and a focus error signal level detecting unit 19. For the tracking control, the optical disc device includes tracking error signal generating units 21 and 22, a tracking control signal generating unit 23 (including tracking control signal generating unit 23a and 23b), a switching unit 24, a tracking actuator driving unit 25, a feed motor control unit 26, a feed motor driving unit 27, a track pitch detecting unit 28, and a tracking error signal level detecting unit 29. The optical disc device further includes a spindle motor 31 for rotating the disc 1, a frequency generator unit 32 for generating a signal corresponding to the revolution speed of the spindle motor 31, and a motor control unit 33 for controlling the spindle motor 31 to make it rotate at a prescribed speed.

Next, the outline of the operation of each block shown in FIG. 1 and the relationship among the blocks will be explained. Referring to FIG. 1, the blue-violet laser diode 3 outputs a blue-violet laser beam. The outputted blue-violet laser beam is condensed and focused on a data layer of the disc 1 by the objective lens 5. Reflected light from the data layer is received by the blue-violet laser detector 7 via the objective lens 5. Meanwhile, the red laser diode 4 outputs a red laser beam. The outputted red laser beam is condensed and focused on a servo layer of the disc 1 by the relay lens 6 and the objective lens 5. Reflected light from the servo layer is received by the red laser detector 8 via the objective lens 5. The focus actuator 9 moves the objective lens 5 in the direction of the rotation axis of the disc 1. The relay lens actuator 10 moves the relay lens 6 in its optical axis direction. The tracking actuator 11 moves the objective lens 5 in the radial direction of the disc 1. The pickup feed motor 12 moves the optical pickup unit 2 in the radial direction of the disc 1. The blue-violet laser detector 7 converts the received reflected light into an electric signal and sends the signal to the focus error signal generating unit 13 and the tracking error signal generating unit 21. The focus error signal generating unit 13 generates a focus error signal based on the signal sent from the blue-violet laser detector 7 and sends the generated signal to the focus control signal generating unit 15a and the focus error signal level detecting unit 19. The focus control signal generating unit 15a generates a focus control signal based on the signal sent from the focus error signal generating unit 13 and sends the generated signal to the switching unit 16. Meanwhile, the red laser detector 8 converts the received reflected light into an electric signal and sends the signal to the focus error signal generating unit 14 and the tracking error signal generating unit 22. The focus error signal generating unit 14 generates a focus error signal based on the signal sent from the red laser detector 8 and sends the generated signal to the focus control signal generating unit 15b and the focus error signal level detecting unit 19. The focus control signal generating unit 15b generates a focus control signal based on the signal sent from the focus error signal generating unit 14 and sends the generated signal to the switching unit 16 and the relay lens actuator driving unit 18. The focus error signal level detecting unit 19 generates a switching signal for the switching unit 16 based on the signals from the focus error signal generating units 13 and 14 and sends the generated signal to the switching unit 16. The switching unit 16 selectively sends the signal from the focus control signal generating unit 15a or the signal from the focus control signal generating unit 15b to the focus actuator driving unit 17 according to the output (switching signal) of the focus error signal level detecting unit 19. The focus actuator driving unit 17 drives the focus actuator 9 according to the signal sent from the switching unit 16. The relay lens actuator driving unit 18 drives the relay lens actuator 10 according to the signal sent from the focus control signal generating unit 15b.

The tracking error signal generating unit 21 generates a tracking error signal based on the signal sent from the blue-violet laser detector 7 and sends the generated signal to the tracking control signal generating unit 23a, the track pitch detecting unit 28 and the tracking error signal level detecting unit 29. The tracking control signal generating unit 23a generates a tracking control signal based on the signal sent from the tracking error signal generating unit 21 and sends the generated signal to the switching unit 24 and the feed motor control unit 26. Meanwhile, the tracking error signal generating unit 22 generates a tracking error signal based on the signal sent from the red laser detector 8 and sends the generated signal to the tracking control signal generating unit 23b, the track pitch detecting unit 28 and the tracking error signal level detecting unit 29. The tracking control signal generating unit 23b generates a tracking control signal based on the signal sent from the tracking error signal generating unit 22 and sends the generated signal to the switching unit 24 and the feed motor control unit 26. The track pitch detecting unit 28 measures the track pitch of the data layer or the servo layer based on the signals from the tracking error signal generating units 21 and 22 and sends a signal representing the measured track pitch to the tracking error signal level detecting unit 29. The tracking error signal level detecting unit 29 generates a switching signal for the switching unit 24 based on the signals from the tracking error signal generating units 21 and 22 and sends the generated signal to the switching unit 24. The switching unit 24 selectively sends the signal from the tracking control signal generating unit 23a or the signal from the tracking control signal generating unit 23b to the tracking actuator driving unit 25 according to the output (switching signal) of the tracking error signal level detecting unit 29. The tracking actuator driving unit 25 drives the tracking actuator 11 according to the signal sent from the switching unit 24. The feed motor control unit 26 generates an optical pickup feed signal based on the signal from the tracking control signal generating unit 23a or the tracking control signal generating unit 23b and sends the generated signal to the feed motor driving unit 27. The feed motor driving unit 27 drives the pickup feed motor 12 according to the signal sent from the feed motor control unit 26.

The spindle motor 31 drives the disc 1. The frequency generator unit 32 converts revolution speed information on the spindle motor 31 into an electric signal and sends the signal to the motor control unit 33. The motor control unit 33 controls the spindle motor 31 according to the signal sent from the frequency generator unit 32 so that the disc 1 rotates at prescribed revolution speed.

Figure 2:
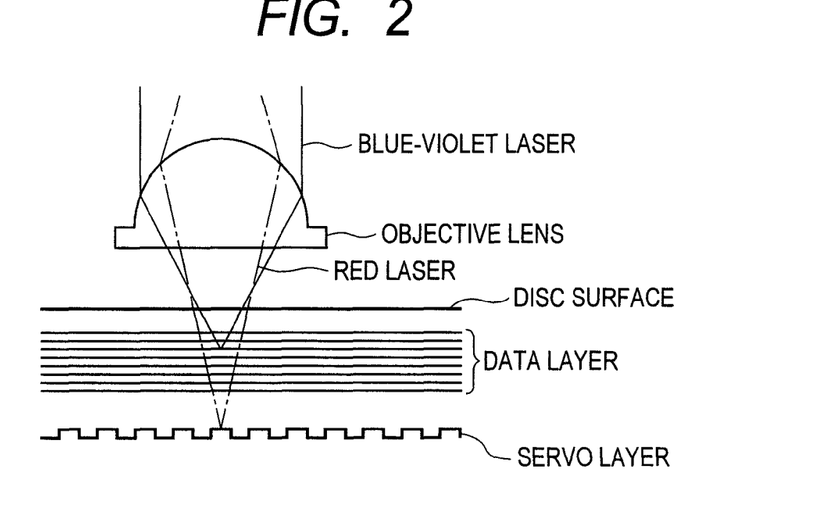
FIG. 2 is a schematic diagram for explaining the configuration of a disc and a control method in accordance with the present invention.

Next, the disc 1 having the data layer(s) and the servo layer and a control method for reading/writing data from/to the disc 1 will be explained referring to FIG. 2. FIG. 2 schematically shows the disc 1 being irradiated with the blue-violet laser beam (solid lines) and the red laser beam (chain lines) via the objective lens 5. The disc 1 has a servo layer and a plurality of data layers. In the servo layer, spiral grooves or pits have been formed similarly to those in conventional optical discs, by which the tracking control is made possible. In contrast, no grooves or pits for the tracking control are formed in the data layers. Thus, in unrecorded parts of the disc, the tracking control is impossible and the position of the beam spot is controlled indirectly by the tracking control in the servo layer. After data recording, the tracking error signal can be acquired and thus the tracking control can be executed directly by use of the tracking error signal.

The blue-violet laser beam is condensed (focused) on an intended one of the data layers by properly controlling the position of the objective lens 5 in the vertical direction in FIG. 2. Since the focusing position of the red laser beam also moves according to the movement of the objective lens, the red laser beam can be condensed (focused) on the servo layer by further controlling the position of the relay lens 6 shown in FIG. 1 properly. If the beam spot of the red laser beam is moved in the track crossing direction by moving the objective lens in the track crossing direction, the focal spot of the blue-violet laser beam also moves similarly in the track crossing direction. To sum up, the focus control is executed by driving the objective lens so as to let the blue-violet laser beam spot focus on the data layer while also driving the relay lens so as to let the red laser beam spot focus on the servo layer.

In the tracking control, when data is recorded (written to the disc), the blue-violet laser beam spot is placed at a prescribed disc radial position on the data layer by driving the objective lens so as to place the red laser beam spot on a prescribed track. When data is reproduced (read from the disc), the position of the blue-violet laser beam spot can be controlled directly since the tracking error signal can be acquired using the returning light from the data layer.

Figure 3A:
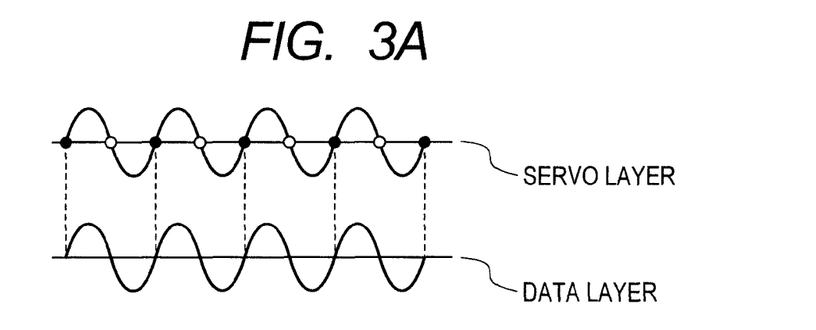
FIGS. 3A and 3B are schematic diagrams for explaining track pitches of a servo layer and a data layer.
Figure 3B:
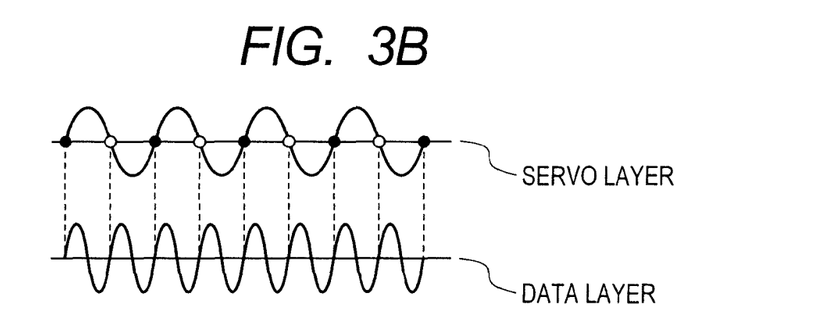

Incidentally, if the data recording is executed in areas corresponding to the same polarity of the error signal generated from the reflected light from the servo layer (black circles in FIG. 3A) as shown in FIG. 3A, the track pitch of the data layer becomes equivalent to that of the servo layer. However, if the data recording is executed also in reverse-polarity areas (white circles in FIG. 3B) as shown in FIG. 3B, the track pitch of the data layer can be reduced by half and the recording density can be increased.

With the decrease in the track pitch, however, the beam spot tends more to deviate from the intended track. While this problem can be resolved in some cases by increasing the control gain, the increasing of the control gain is generally not easy due to factors like the pickup mechanism, characteristics of the response to scratches on the disc, etc. Considering the above facts, it is possible to improve the performance of the device by executing switching between/among a plurality of control systems (employing layers differing in the track pitch) so as to select an appropriate control system.

Next, the tracking control operation in normal data reproduction (data reading) and an operation in cases of detrack will be explained.

Figure 4:
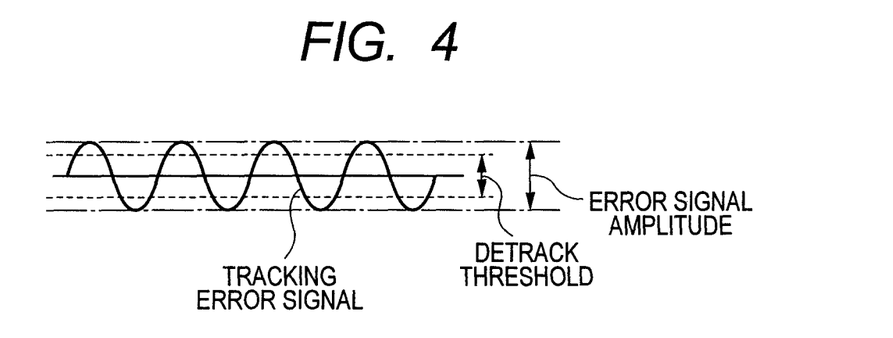
FIG. 4 is a schematic diagram for explaining a threshold value which is used for switching in accordance with the present invention.

In normal data reproduction, the switching unit 24 selects the output of the tracking control signal generating unit 23a. Therefore, the tracking control of the objective lens 5 is executed based on the reflected light from the data layer. This is because reproduced signals of higher quality can be acquired by executing the control by using the error signal generated from actually reproduced data rather than by using the error signal acquired from the servo layer. The tracking error signal level detecting unit 29 monitors the amount of detrack (hereinafter referred to as a "detrack level") of the beam spot condensed on the data layer based on the output of the tracking error signal generating unit 21 and outputs a signal for switching the switching unit 24 when the detrack level reaches or exceeds a prescribed level. The prescribed level is set based on the amplitude of the error signal acquired from the data layer as shown in FIG. 4.

Figure 5:
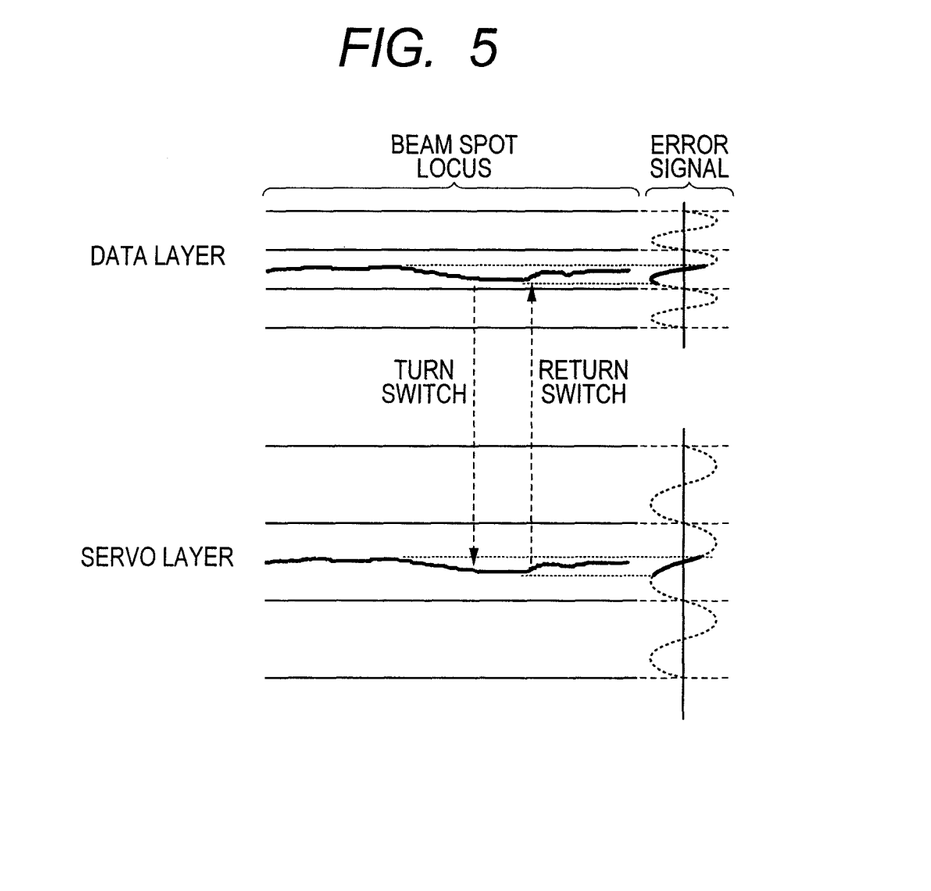
FIG. 5 is a schematic diagram for explaining an example of a switching operation for switching between control systems in accordance with the present invention.

FIG. 5 schematically shows the tracking locus of the beam spot on the data layer, the tracking locus of the beam spot on the servo layer and the tracking error signal acquired from each layer in the case where the detrack level of the beam spot on the data layer has reached or exceeded the prescribed level. When the gradually increasing detrack level of the beam spot on the data layer has exceeded a threshold value, the tracking error signal level detecting unit 29 turns the switch of the switching unit 24. As the detrack level increases further, the tracking error signal of the data layer exceeds the negative feedback region of the tracking control (thick line in the upper right area of FIG. 5) and thus the control using the error signal from the data layer becomes impossible. However, in cases where the track pitch of the servo layer is wider than that of the data layer, the negative feedback region of the tracking control on the servo layer is also wider, and thus the tracking control can be continued by turning the switch and using the error signal from the servo layer (thick line in the lower right area of FIG. 5).

Thus, if the tracking control is executed using only the tracking error signal of the data layer without carrying out the switching, the beam spot deviates from the targeted track and it becomes necessary to once turn off the tracking control loop and perform the seek operation in order to return the beam spot to the targeted track. The switching makes it possible to return the beam spot to the targeted track while continuing the tracking control. Such an effect is restricted to cases where the track pitch of the servo layer is wider than that of the data layer. Thus, the tracking error signal level detecting unit 29 judges whether to perform the switching operation or not based on the output of the track pitch detecting unit 28. The track pitch detecting unit 28 detects the track pitches by the following method: When the track pitches of already-recorded disc are unknown, the track pitches of the data layer and the servo layer are measured upon the insertion of the disc into the device. The track pitch of each layer is calculated by counting the number of crossed tracks based on the tracking error signal of each layer (data layer, servo layer) when the objective lens is stopped at a fixed position without the tracking control. When the track pitch of the data layer or the servo layer is already known, the track pitch in question can also be calculated by counting the number of tracks when the objective lens is shifted by a prescribed distance.

After the switching, the tracking error signal level detecting unit 29 monitors the detrack level of the beam spot condensed on the servo layer based on the output of the tracking error signal generating unit 22. When the detrack level has decreased to or below a prescribed level, the tracking error signal level detecting unit 29 outputs a signal so as to return the switch of the switching unit 24.

Figure 6:
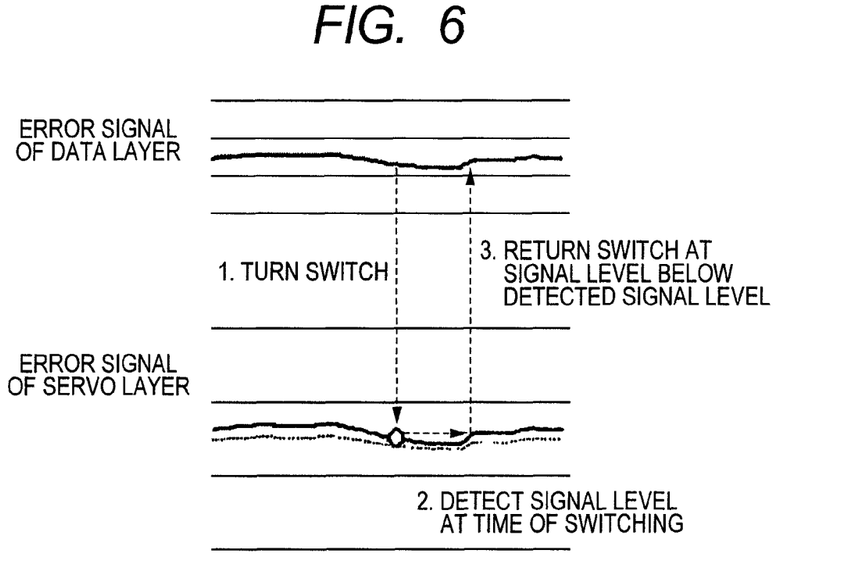
FIG. 6 is a schematic diagram for explaining another example of the switching operation in accordance with the present invention.

While the tracking error signal level detecting unit 29 in the above example operates so as to return the switch of the switching unit 24 using a preset threshold value, the operation in the present invention is not restricted to this example. As shown in FIG. 6 for example, the tracking error signal level detecting unit 29 may detect the signal level of the tracking error signal generated from the servo layer at the point when the detrack level of the beam spot on the data layer reaches/exceeds a prescribed level and generate the threshold value (for returning the switch) based on the detected signal level. In this case, ill effects of offsets and amplitudes of the tracking error signals of both layers (servo layer, data layer) can be reduced.

Figure 7:
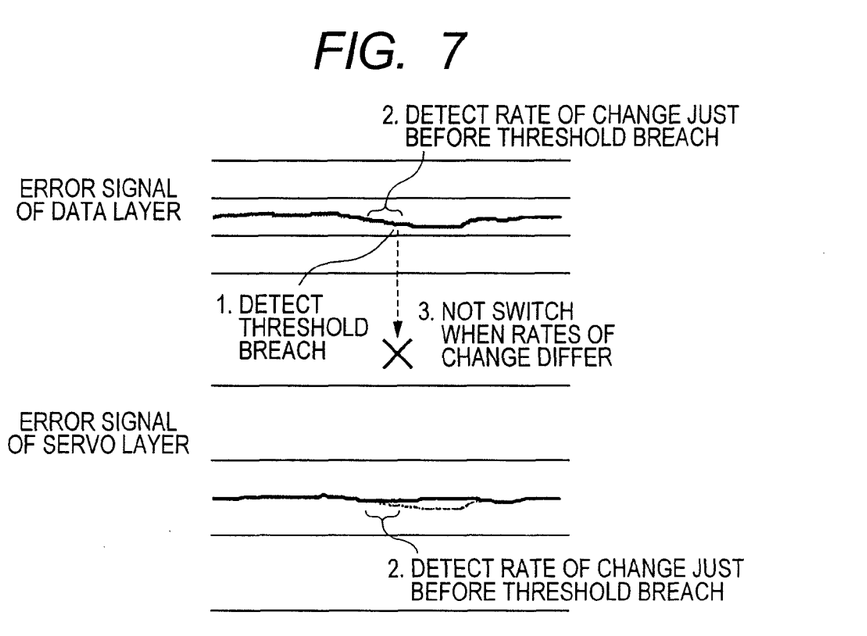
FIG. 7 is a schematic diagram for explaining still another example of the switching operation in accordance with the present invention.

Further, while the tracking error signal level detecting unit 29 in the above example switches (turns) the switching unit 24 based on the detrack level of the beam spot on the data layer, the operation in the present invention is not restricted to this example. As shown in FIG. 7 for example, in addition to the comparison of the signal level of the tracking error signal generating unit 21 with the threshold value for turning the switch, the tracking error signal level detecting unit 29 may also compare the rates of change of the signal levels of the tracking error signal generating units 21 and 22 just before the signal level of the tracking error signal generating unit 21 exceeds the threshold value and turn the switching unit 24 if the compared rates of change are close to each other. In this case, it is possible to switch (turn) the switching unit 24 only when the detracks of the data layer and the servo layer coincide with each other (in cases of external vibration, track distortion of the servo layer, etc.), without switching (turning) the switching unit 24 when the detracks of the data layer and the servo layer do not coincide with each other due to detrack in data recording, etc.

Furthermore, gain fluctuation caused by the difference in the track pitch between the data layer and the servo layer can be compensated for by the tracking control signal generating unit 23b, by which the loop gain of the tracking control can be kept constant before and after the switching.

Moreover, in the case where the track pitch of the servo layer is wider than that of the data layer, the tracking error signal generating unit 22 and the tracking control signal generating unit 23b are kept in operation even when the switching unit 24 is selecting the output of the tracking control signal generating unit 23a. Specifically, a filter inside the tracking control signal generating unit 23b is kept in operation according to the error signal, by which a transient mismatch of the control signal occurring just after the switching can be reduced.

Next, the focus control operation in normal data recording/reproduction and an operation in cases of defocus will be explained. The focus control in the data recording can be executed in the same operation as the focus control in the data reproduction. As for the focus error signal's negative feedback region in which the focus control is possible, the negative feedback region of the servo layer can be set wider than that of the data layer by properly designing the pickup.

In normal data recording/reproduction, the switching unit 16 selects the output of the focus control signal generating unit 15a. Therefore, the focus control of the objective lens 5 is executed based on the reflected light from the data layer and the focus control of the relay lens 6 is executed based on the reflected light from the servo layer. The focus error signal level detecting unit 19 monitors the amount of defocus (hereinafter referred to as a "defocus level") of the beam spot condensed on the data layer based on the output of the focus error signal generating unit 13 and outputs a signal for switching the switching unit 16 when the defocus level reaches or exceeds a prescribed level. Thereafter, the focus control of the objective lens 5 is executed based on the reflected light from the servo layer. The prescribed level can be set similarly to the aforementioned example of the tracking control.

The operation sequence when the defocus level of the beam spot on the data layer has reached/exceeded the prescribed level can be conducted similarly to the aforementioned example of the tracking control. Specifically, when the gradually increasing defocus level of the beam spot on the data layer has exceeded the threshold value, the focus error signal level detecting unit 19 turns the switch of the switching unit 16. After the switching, the focus error signal level detecting unit 19 monitors the defocus level of the beam spot condensed on the servo layer based on the output of the focus error signal generating unit 14. When the defocus level has decreased to or below a prescribed level, the focus error signal level detecting unit 19 outputs a signal so as to return the switch of the switching unit 16.

While the focus control signal generating unit 15b in the above example keeps outputting its signal to the relay lens actuator driving unit 18 even after the switching, the operation in the present invention is not restricted to this example. Specifically, the focus control signal generating unit 15b may hold its output value at the value just before the switching while the switch is in the turned state. In this case, similarly to the tracking control, the focus error signal level detecting unit 19 may detect the signal level of the focus error signal generated from the servo layer at the point when the defocus level of the beam spot on the data layer reaches/exceeds a prescribed level and generate the threshold value (for returning the switch) based on the detected signal level.

Similarly to the tracking control, in addition to the comparison of the signal level of the focus error signal generating unit 13 with the threshold value for turning the switch, the focus error signal level detecting unit 19 may also compare the rates of change of the signal levels of the focus error signal generating units 13 and 14 just before the signal level of the focus error signal generating unit 13 exceeds the threshold value and turn the switching unit 16 if the compared rates of change are close to each other. In this case, it is possible to switch (turn) the switching unit 16 only when the defocuses of the data layer and the servo layer coincide with each other (in cases of external vibration, surficial wobbling of both layers (data layer, servo layer), etc.), without switching (turning) the switching unit 16 when the defocuses of the data layer and the servo layer do not coincide with each other due to distortion intrinsic to the data layer or the servo layer, etc.

Furthermore, similarly to the tracking control, gain fluctuation caused by the difference in a focus negative feedback region between the data layer and the servo layer can be compensated for by the focus control signal generating unit 15b, by which the loop gain of the focus control can be kept constant before and after the switching.

Moreover, while a blue-violet laser beam and a red laser beam are used in the above embodiment, the types of the laser beams employed for the present invention are not restricted to the above example. For example, effects similar to those of the embodiment can be achieved also when blue-violet laser beams or red laser beams are used for both layers (data layer, servo layer).

As described above, in cases where the negative feedback region of the feedback control on the servo layer is wider than that on the data layer, resistance to control disturbances can be increased by switching the error signals and the control units.

While the resistance to control disturbances is increased in the above embodiment by detecting an increase in the detrack or the defocus and executing the switching between the outputs of the control signal generating units, similar effects can be achieved also by executing the control by converting the error signal of the servo layer into the error signal of the data layer as will be described below.

Second Embodiment

The configuration of an optical disc device in accordance with a second embodiment of the present invention will be described referring to FIG. 8.

Figure 8:
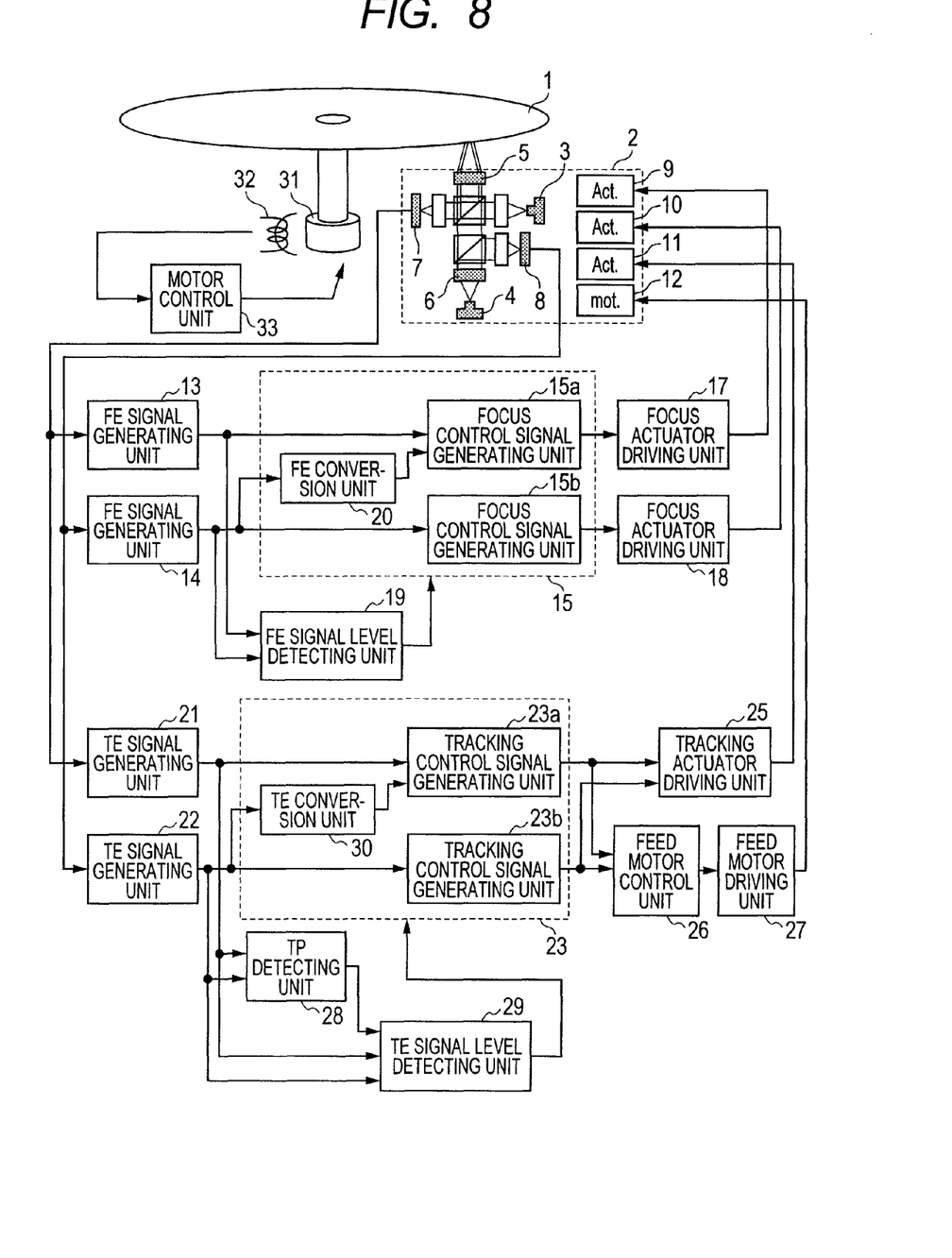
FIG. 8 is a schematic block diagram showing the configuration of an optical disc device in accordance with a second embodiment of the present invention.

The blocks (components) 1-19, 21-29 and 31-33 in FIG. 8 are equivalent to those in the first embodiment, and thus repeated explanation thereof is omitted for brevity. In FIG. 8, the reference characters "20" and "30" represent a focus error conversion unit and a tracking error conversion unit, respectively.

Next, the outline of the operation of each block shown in FIG. 8 and the relationship among the blocks will be explained. The relationship among the blocks 1-14, 21, 22 and 31-33 in FIG. 8 is equivalent to that in the first embodiment, and thus repeated explanation thereof is omitted. The focus error signal generating unit 13 generates a focus error signal based on the signal sent from the blue-violet laser detector 7 and sends the generated signal to the focus control signal generating unit 15a and the focus error signal level detecting unit 19. Meanwhile, the focus error signal generating unit 14 generates a focus error signal based on the signal sent from the red laser detector 8 and sends the generated signal to the focus control signal generating unit 15b and the focus error conversion unit 20. The focus error conversion unit 20 calculates an error signal proportional to the defocus level of the beam spot on the data layer based on the signal sent from the focus error signal generating unit 14 and sends the calculated signal to the focus control signal generating unit 15a. The focus control signal generating unit 15a generates a focus control signal based on the signals sent from the focus error signal generating unit 13 and the focus error conversion unit 20 and sends the generated signal to the focus actuator driving unit 17. Meanwhile, the focus control signal generating unit 15b generates a focus control signal based on the signal sent from the focus error signal generating unit 14 and sends the generated signal to the relay lens actuator driving unit 18. The focus error signal level detecting unit 19 generates a signal for the selection of the focus error signal based on the signals from the focus error signal generating units 13 and 14 and sends the generated signal to the focus control signal generating unit 15.

The tracking error signal generating unit 21 generates a tracking error signal based on the signal sent from the blue-violet laser detector 7 and sends the generated signal to the tracking control signal generating unit 23a, the track pitch detecting unit 28 and the tracking error signal level detecting unit 29. Meanwhile, the tracking error signal generating unit 22 generates a tracking error signal based on the signal sent from the red laser detector 8 and sends the generated signal to the tracking control signal generating unit 23b, the track pitch detecting unit 28, the tracking error signal level detecting unit 29 and the tracking error conversion unit 30. The tracking error conversion unit 30 calculates an error signal proportional to the detrack level of the beam spot on the data layer based on the signal sent from the tracking error signal generating unit 22 and sends the calculated signal to the tracking control signal generating unit 23a. The tracking control signal generating unit 23a generates a tracking control signal based on the signals sent from the tracking error signal generating unit 21 and the tracking error conversion unit 30 and sends the generated signal to the tracking actuator driving unit 25 and the feed motor control unit 26. Meanwhile, the tracking control signal generating unit 23b generates a tracking control signal based on the signal sent from the tracking error signal generating unit 22 and sends the generated signal to the tracking actuator driving unit 25 and the feed motor control unit 26. The track pitch detecting unit 28 measures the track pitch of the data layer or the servo layer based on the signals from the tracking error signal generating units 21 and 22 and sends a signal representing the measured track pitch to the tracking error signal level detecting unit 29. The tracking error signal level detecting unit 29 generates a signal for the selection of the tracking error signal based on the signals from the tracking error signal generating units 21 and 22 and sends the generated signal to the tracking control signal generating unit 23. The feed motor control unit 26 generates an optical pickup feed signal based on the signal from the tracking control signal generating unit 23a or the tracking control signal generating unit 23b and sends the generated signal to the feed motor driving unit 27.

Figure 9:
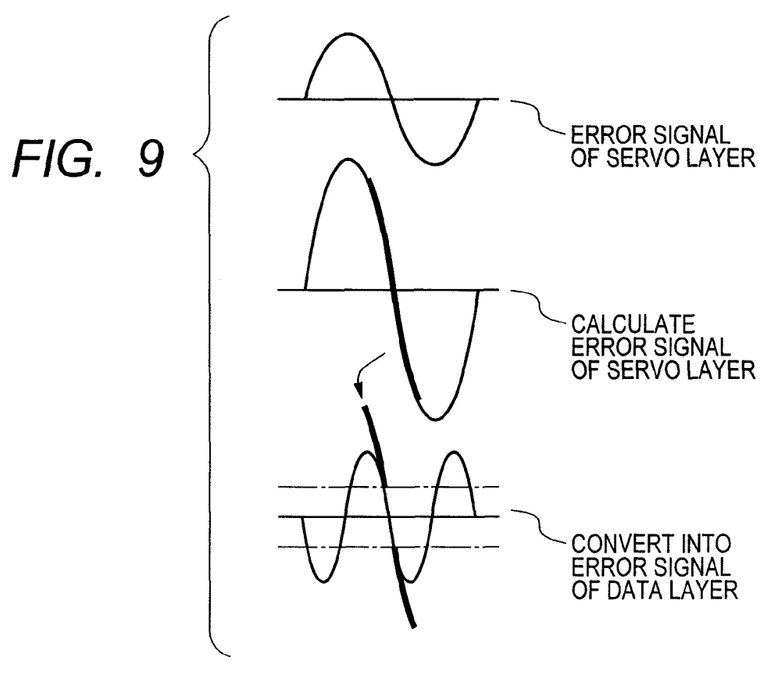
FIG. 9 is a schematic block diagram for explaining error conversion in accordance with the second embodiment.

Next, the operation of the tracking error conversion unit 30 and the tracking control signal generating unit 23a will be explained referring to FIG. 9. The tracking error conversion unit 30 converts the signal sent from the tracking error signal generating unit 22 based on the track pitches of both layers (data layer, servo layer) and an error signal amplitude ratio (tracking error signal amplitude ratio) between the servo layer and the data layer and sends the converted signal to the tracking control signal generating unit 23a. The conversion is executed according to the following expression (1):

$$Y = X \times (Ts/Td) \times (As/Ad) \quad (1)$$

where "X" represents the value of the signal sent from the tracking error signal generating unit 22, "Ts/Td" represents the track pitch ratio between the servo layer and the data layer, "As/Ad" represents the error signal amplitude ratio between the servo layer and the data layer, and "Y" represents the value of the converted signal.

In cases where the data layer and the servo layer have offsets, the conversion may be executed taking the offsets into account. When the gradually increasing detrack level of the beam spot on the data layer has exceeded a threshold value, the tracking error signal level detecting unit 29 outputs a signal to the tracking control signal generating unit 23 so that the output of the tracking error conversion unit 30 is selected as the tracking error signal. Accordingly, the tracking control signal generating unit 23a generates the tracking control signal using the signal sent from the tracking error conversion unit 30 as the tracking error signal. After the switching of the selection of the tracking error signal, the tracking error signal level detecting unit 29 monitors the detrack level of the beam spot condensed on the servo layer based on the output of the tracking error signal generating unit 22. When the detrack level has decreased to or below a prescribed level, the tracking error signal level detecting unit 29 outputs a signal to the tracking control signal generating unit 23 so that the signal sent from the tracking error signal generating unit 21 is selected as the tracking error signal.

The focus error conversion unit 20 and the focus control signal generating unit 15a also operate similarly to the above tracking control. The focus error conversion unit 20 converts the signal sent from the focus error signal generating unit 14 based on the focus servo negative feedback regions of both layers (data layer, servo layer) and an error signal amplitude ratio (focus error signal amplitude ratio) between the servo layer and the data layer and sends the converted signal to the focus control signal generating unit 15a. When the gradually increasing defocus level of the beam spot on the data layer has exceeded a threshold value, the focus error signal level detecting unit 19 outputs a signal to the focus control signal generating unit 15 so that the output of the focus error conversion unit 20 is selected as the focus error signal. Accordingly, the focus control signal generating unit 15a generates the focus control signal using the signal sent from the focus error conversion unit 20 as the focus error signal. After the switching of the selection of the focus error signal, the focus error signal level detecting unit 19 monitors the defocus level of the beam spot focused on the servo layer based on the output of the focus error signal generating unit 14. When the defocus level has decreased to or below a prescribed level, the focus error signal level detecting unit 19 outputs a signal to the focus control signal generating unit 15 so that the signal sent from the focus error signal generating unit 13 is selected as the focus error signal.

As described above, in cases where the negative feedback region of the feedback control on the servo layer is wider than that on the data layer, the controllable range can be expanded by the conversion of the error signal (tracking error signal, focus error signal) of the servo layer into the error signal of the data layer. Since the control can be executed by using error signals having high linearity in wide ranges, the resistance to control disturbances can be increased.

While the present invention has been described above with reference to the embodiments, the present invention is not to be restricted to the particular illustrative embodiments. A variety of modifications understandable to those skilled in the art can be made to the configuration and details of the present invention within the scope of the present invention.

What is claimed is:

1. An optical disc device employing an optical pickup which reproduces or records information by reading or writing data from/to a disc having a data layer and a servo layer, the optical disc device comprising:
   an objective lens which moves in a radial direction of the disc and thereby moves focusing positions of first and second beam spots in the radial direction of the disc;
   a tracking actuator which drives the objective lens in the radial direction of the disc;
   a first detector which converts reflected light of the first beam spot from the data layer into an electric signal;
   a second detector which converts reflected light of the second beam spot from the servo layer into an electric signal;
   a first tracking error signal generating unit which generates a first tracking error signal based on the output of the first detector;
   a second tracking error signal generating unit which generates a second tracking error signal based on the output of the second detector;
   a tracking control unit which generates a control signal for positioning the first beam spot or the second beam spot at a prescribed track based on the output of the first tracking error signal generating unit or the second tracking error signal generating unit;
   a tracking actuator driving unit which drives the tracking actuator based on the output of the tracking control unit; and
   a tracking error level detecting unit which detects a tracking error level based on the output of the first tracking error signal generating unit or the second tracking error signal generating unit, wherein:
   the tracking control unit drives the tracking actuator based on the output of the first detector in normal data reproduction, and
   the tracking control unit detects that the output of the first tracking error signal generating unit has exceeded a prescribed range based on the output of the tracking error level detecting unit and then operates to drive the tracking actuator based on the output of the second detector, and
   the tracking control unit detects that the output of the second tracking error signal generating unit has come within a prescribed range based on the output of the tracking error level detecting unit and then operates to drive the tracking actuator based on the output of the first detector again.

2. The optical disc device according to claim 1, further comprising a track pitch detecting unit which detects track pitches of the data layer and the servo layer, wherein:
   when the track pitch of the servo layer is wider than that of the data layer, the tracking control unit drives the tracking actuator based on the output of the first detector or the second detector depending on the output of the tracking error level detecting unit.

3. The optical disc device according to claim 1, wherein:
   the tracking control unit includes:
      a first tracking control unit which includes a first filter and generates a control signal based on the output of the first tracking error signal generating unit; and
      a second tracking control unit which includes a second filter and generates a control signal based on the output of the second tracking error signal generating unit; and a switching unit to which the outputs of the first and second tracking control units are inputted, and the first tracking control unit continues the operation of the first filter based on the output of the first tracking error signal generating unit even when the output of the first tracking control unit is not selected by the switching unit, and the second tracking control unit continues the operation of the second filter based on the output of the second tracking error signal generating unit even when the output of the second tracking control unit is not selected by the switching unit.

4. The optical disc device according to claim 1, wherein:

the tracking control unit includes tracking error conversion unit which converts the output of the second tracking error signal generating unit into the output of the first tracking error signal generating unit, and the tracking control unit operates to drive the tracking actuator based on the output of the tracking error conversion unit when the output of the first tracking error signal generating unit has exceeded a prescribed range, and the tracking control unit operates to drive the tracking actuator based on the output of the first tracking error signal generating unit again when the output of the second tracking error signal generating unit has come within a prescribed range.

5. The optical disc device according to claim 1, wherein:

the tracking error level detecting unit stores the output of the second tracking error signal generating unit when the output of the first tracking error signal generating unit exceeds the prescribed range, and the tracking error level detecting unit determines a condition for the tracking control unit, for the driving of the tracking actuator based on the output of the first detector again, based on the stored output of the second tracking error signal generating unit.

6. The optical disc device according to claim 1, wherein:

the tracking error level detecting unit detects the time derivative of the output signal of the first tracking error signal generating unit and the time derivative of the output signal of the second tracking error signal generating unit just before the output of the first tracking error signal generating unit exceeds the prescribed range, and the tracking control unit drives the tracking actuator based on the output of the second detector only when the difference between the time derivatives is within a prescribed range.

7. An optical disc device employing an optical pickup which reproduces or records information by reading or writing data from/to a disc having a data layer and a servo layer, wherein:

the optical pickup is configured so that the servo negative feedback region of a second focus error signal generated based on reflected light of a second beam spot condensed on the servo layer is wider than the servo negative feedback region of a first focus error signal generated based on reflected light of a first beam spot condensed on the data layer;

the optical disc device further comprising:

an objective lens which moves in an optical axis direction of the disc and thereby moves focusing positions of the first beam spot condensed on the data layer and the second beam spot condensed on the servo layer in the optical axis direction of the disc;

a relay lens which moves in the optical axis direction of the disc and thereby moves the focusing position of the second beam spot in the optical axis direction of the disc;

a focus actuator which drives the objective lens in the optical axis direction;

a relay lens actuator which drives the relay lens in the optical axis direction;

a first detector which converts reflected light of the first beam spot from the data layer into an electric signal;

a second detector which converts reflected light of the second beam spot from the servo layer into an electric signal;

a first focus error signal generating unit which generates a first focus error signal based on the output of the first detector;

a second focus error signal generating unit which generates a second focus error signal based on the output of the second detector;

a first focus control unit which generates a control signal for positioning the first beam spot on a prescribed data layer based on the output of the first focus error signal generating unit;

a second focus control unit which generates a control signal for positioning the second beam spot on the servo layer based on the output of the second focus error signal generating unit;

a focus actuator driving unit which drives the focus actuator based on the output of the first focus control unit;

a relay lens actuator driving unit which drives the relay lens actuator based on the output of the second focus control unit; and a focus shift level detecting unit which detects a focus shift level based on the output of the first focus error signal generating unit or the second focus error signal generating unit, wherein:

the first focus control unit drives the focus actuator based on the output of the first detector and the second focus control unit drives the relay lens actuator based on the output of the second detector in normal data reproduction/recording, and when the output of the first focus error signal generating unit has exceeded a prescribed range, the second focus control unit holds its output and the first focus control unit operates to drive the focus actuator based on the output of the second detector, and when the output of the second focus error signal generating unit has come within a prescribed range, the first focus control unit operates to drive the focus actuator based on the output of the first detector again and the second focus control unit operates to drive the relay lens actuator based on the output of the second detector.

8. The optical disc device according to claim 7, further comprising a focus error conversion unit which converts the output of the second focus error signal generating unit into the output of the first focus error signal generating unit, wherein:

when the output of the first focus error signal generating unit has exceeded a prescribed range, the second focus control unit holds its output and the first focus control unit operates to drive the focus actuator based on the output of the focus error conversion unit, and when the output of the second focus error signal generating unit has come within a prescribed range, the first focus control unit operates to drive the focus actuator based on the output of the first detector again and the second focus control unit operates to drive the relay lens actuator based on the output of the second detector.

* * * * *